Patented July 4, 1939

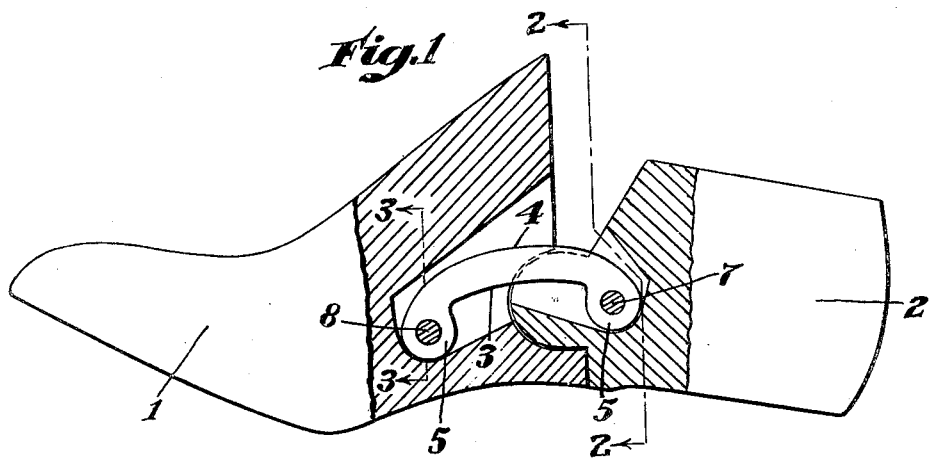
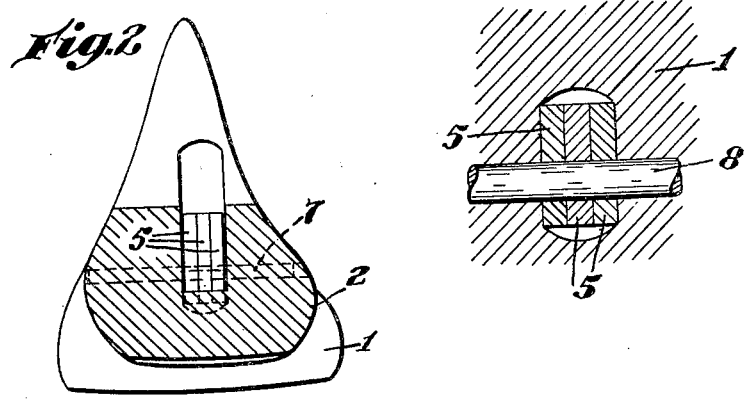
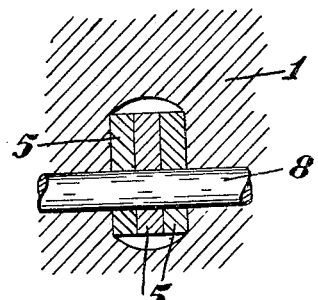
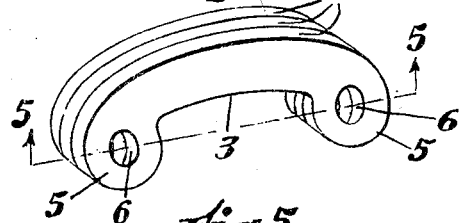
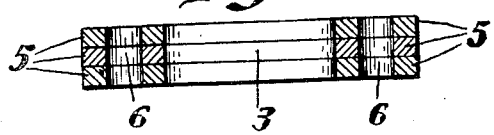

2,165,006

UNITED STATES PATENT OFFICE 2,165,006

LAST

Louis W. Reinhardt, Brockton, Mass., assignor to Belcher Hinge Company, Stoughton, Mass., a corporation of Massachusetts Application November 15, 1937, Serial No. 174,626

4 Claims. (Cl. 12—136)

In the manufacture of so-called divided or hinge lasts, one of the types developed to more or less standard form has been that having a rather stiff but slightly resilient connecting link. The link in certain popular forms spans a central knuckle formed by a saw cut between the heel part and the fore part and constituting a free intermediate metal fulcrum between the parts. It is generally described as moving above and below center. This particular type was characteristically established by the old Peterson Patent No. 1,195,266, and has been produced in variously modified forms with quite general acceptability to the shoe manufacturer.

However, as was early indicated in successive patents granted on the various structures developed from time to time, the demands of shoemaking have been increasingly exacting. This is true particularly as to increases in pressures as in leveling or beating out and in the resultant stresses and strains to which the incident lasts were subjected. These difficulties and defects have resulted in complaints of increased breakage in links often with the ruin of the shoe in process of formation on the last.

Further to meet these difficulties I have provided for another modification which seems to stand up better than some of my other forms. In this I have developed a laminated link which shows several increased advantages without corresponding cost for material or manufacture.

It provides for a broad pin bearing but does not take out as much wood as did my folded link of my prior Patent No. 1,771,008. Moreover, the pin bearings are continuous surfaces instead of narrow edges so that the wear on the pin is better distributed.

I am, of course, aware that built-up links have been made but these were also relatively thick and required wide weakening kerfs. Most such links were made up sandwich fashion with rigid plates and interposed springs of various sorts. Such links, however, develop slack and looseness so that twisting or weaving tendencies develop which result in cracks and the splitting of the wood of the parts.

My laminated links are self-sustaining throughout on account of their snug interfacial contacts which resist torsional strains and provide for maximum strength with minimum thickness so only narrow kerfs are required.

These will immediately appear to those experienced in this art from the following specification as illustrated by the drawing, in which:

Fig. 1 is a longitudinal section through a portion of a last fitted with one of my laminated links.

Fig. 2 is a section on the indicated line 2—2, of Fig. 1, and showing one of the laminated pin bearings.

Fig. 3 is a section through such a bearing with its pin shown in elevation.

Fig. 4 is a view of one of my laminated links removed, and

Fig. 5 is a bottom view of such a link partly sectioned longitudinally at its bearing ends.

Referring to the drawing I have shown in Fig. 1, a heel part 2, and a toe part 1, the latter being broken off to shorten the figure.

These are of familiar type, the toe part 1 being severed by a cut leaving a semi-cylindrical socket and the heel part 2 bearing the corresponding convex knuckle which together constitute the intermediate bearing between the two parts of the last after being divided or severed from their original block or unitary form.

Through this knuckle portion extends a longitudinal slot or kerf consisting of aligned portions sawed or milled in the opposing faces of the heel and the toe or fore part of the last. By sawing these kerfs with flat side walls and semi-cylindrical end walls I obtain a relatively narrow link receiving chamber. In this I locate a plurality of flat laminae in free interfacial contact with each other and of a total or aggregate thickness substantially equal to the width of the slot between its lateral kerf walls.

Each of the laminae 4 is notched as at 3 along one of its edges between its ends 5 which are of generally circular or nearly round washer-like form. They constitute thin flat cylindricities connected by a flat slightly arched web left by the notching at 3 of the opposite edge of the leaf. Each of these end bearings 5 is pierced by an eye 6 so that when they are aligned in assembly on the pins 7 and 8 they present a continuous cylindrical inner surface or bearing walls for the pins.

Such a composite laminated link is assembled as is usual in this type of last under a slight stress so as to draw the faces of the knuckle members on fore and heel parts up in firm contact and take up any wear that may develop through continued flexing of the parts.

The combined thickness of the laminae nearly fills, but of course actually does not completely take up the full space of the kerf. They can, however, be given so slight a clearance as to prevent the parts from twisting or weaving.

As the laminae are freely assembled, they are capable of slight relative interfacial movement in attaining and maintaining their respective positions.

The number of laminae so assembled depends on their thickness and that in turn is relatable to the metal used and its temper or degree of temper. For the purposes of illustration I have shown a composite link of three laminae but that is purely illustrative as I may use for certain lasts links of only two laminae or for others four or more.

The shape or contour may be varied by various notchings and while preferably the laminae are symmetrically assembled, one or more may be reversed, but as this usually requires the cutting away of more wood, it is not recommended as tending to weaken the last. The link members or laminae may be variously formed according to the stock used and may constitute relatively thin forgings as in the old Peterson type of link or stampings of thinner stock or combinations of different materials to get any desired effect and all without departing from my concept as above set forth.

What I therefore claim and desire to secure by Letters Patent is:—

1. In a divided last, a fore part and a heel part having a common pivoting knuckle bearing therebetween, and an aligned narrow longitudinal kerf in each of said parts and constituting a link recess, a resilient link member consisting of plural relatively thin identical resilient, interfacially contacting and freely assembled flat laminae having a total thickness substantially the width of the kerf and notched intermediate their ends to form a central bow portion and end portions shaped thereon as flat cylindrical pivot bearings having eye portions having their pin receiving eyes of the same diameter and aligned to provide closely adjacent cylindrical pin bearings of substantially continuous interior surface, whereby the inter-pintal strain between the fore part and heel part is distributed uniformly along the pin surface from wall to wall of the link kerf without binding or buckling tendencies.

2. In a divided last, a fore part and a heel part having a common pivoting knuckle bearing therebetween, and an aligned narrow longitudinal kerf in each of said parts and constituting a link recess, a resilient link member consisting of plural relatively thin identical resilient, interfacially contacting and freely assembled flat laminae having a total thickness substantially the width of the kerf and shaped to form a central bow portion and having disc-like end portions shaped as flat cylindrical pivot bearings and having eye portions having their pin receiving eyes of the same diameter and aligned to provide closely adjacent cylindrical pin bearings of substantially continuous interior surface, whereby the interpintal strain between the fore part and heel part is distributed uniformly along the pin surface from wall to wall of the link kerf without binding or buckling tendencies.

3. In a divided last, a resilient link member consisting of plural relatively thin identical resilient, interfacially contacting and freely assembled flat laminae notched intermediate their ends to form a central bow portion and end portions shaped thereon as flat cylindrical pivot bearings having eye portions having their pin receiving eyes of the same diameter and aligned to provide closely adjacent cylindrical pin bearings of substantially continuous interior surface, whereby pintal strain is distributed uniformly along the pin surface of the link without binding or buckling the devices.

4. A last as in claim 1, in which the slot is a relatively wide flat wall milled slot and in which the link member is made of three laminae.

LOUIS W. REINHARDT.